Dec. 2, 1952     H. J. REYNOLDS ET AL     2,619,935
POULTRY FEEDING MACHINE
Filed Jan. 29, 1949     3 Sheets-Sheet 1
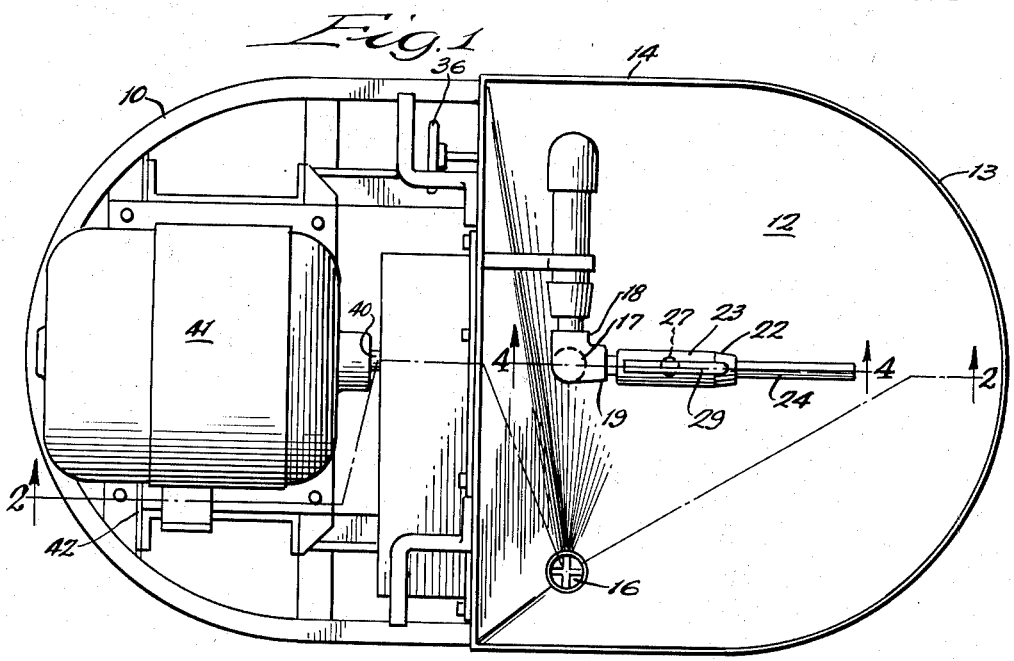
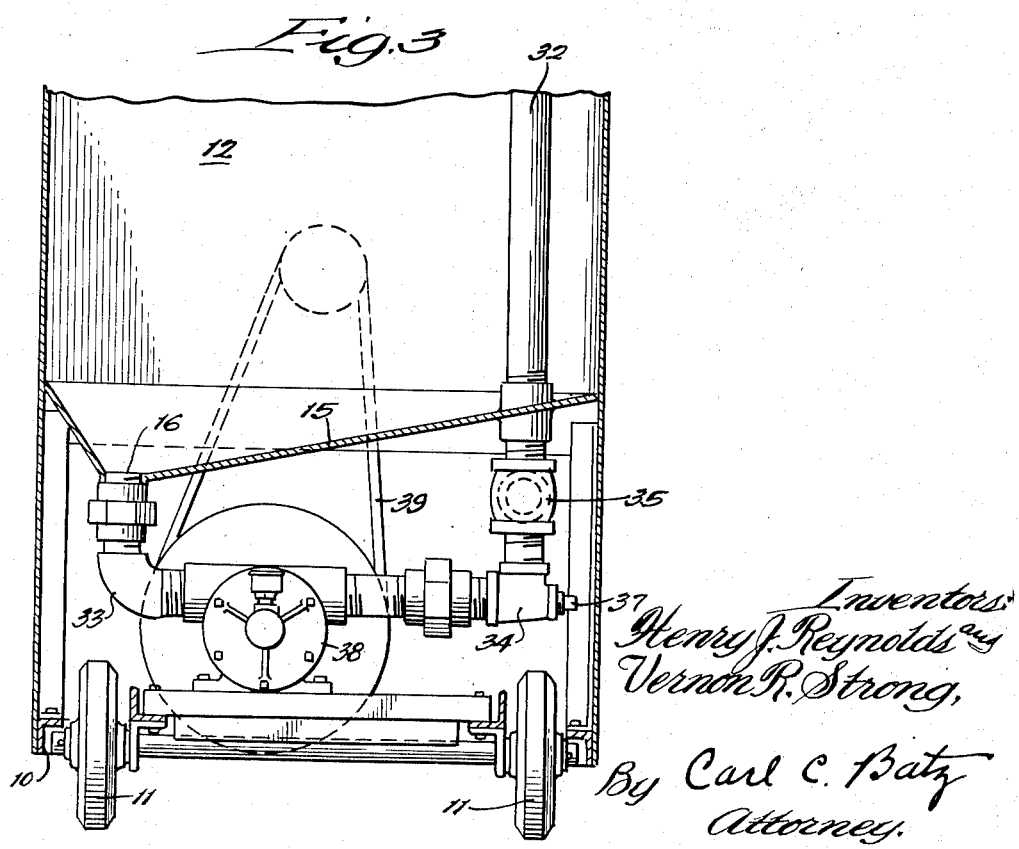
Inventors:
Henry J. Reynolds and
Vernon R. Strong,
By Carl C. Batz
Attorney.

Dec. 2, 1952  H. J. REYNOLDS ET AL  2,619,935
POULTRY FEEDING MACHINE
Filed Jan. 29, 1949  3 Sheets-Sheet 2

Inventors:
Henry J. Reynolds
and Vernon R. Strong,
By Carl C. Batz
Attorney.

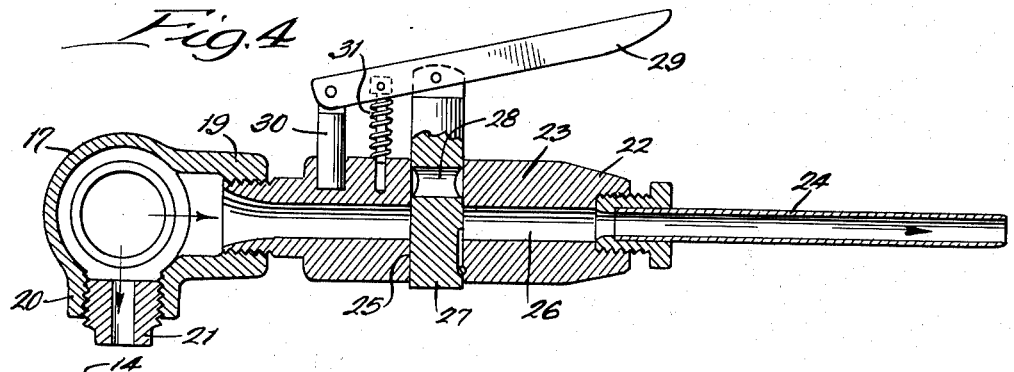
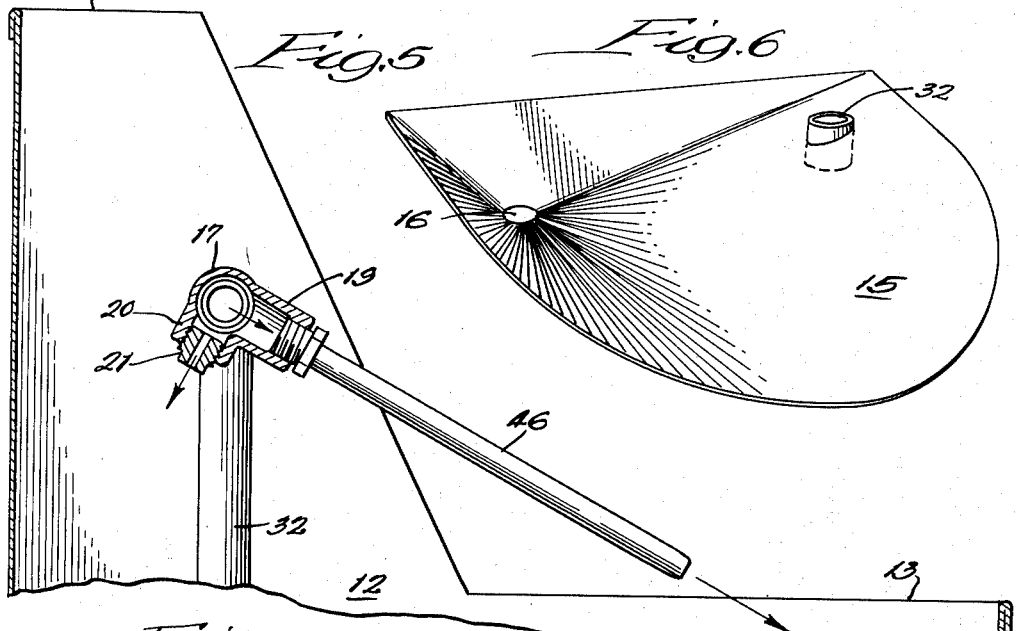
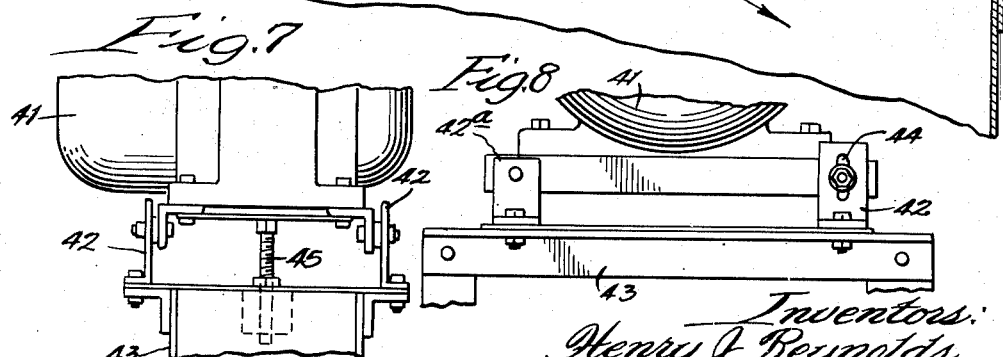

Patented Dec. 2, 1952

2,619,935

UNITED STATES PATENT OFFICE 2,619,935

POULTRY FEEDING MACHINE

Henry J. Reynolds, Wheaton, Ill., and Vernon R. Strong, Ogden, Utah, assignors to Armour and Company, Chicago, Ill., a corporation of Illinois Application January 29, 1949, Serial No. 73,637

3 Claims. (Cl. 119—51)

This invention relates to a poultry feeding machine and is particularly useful in the individual feeding of poultry with liquid feed material.

An object of the invention is to provide a machine in which a supply of liquid feed material is kept in continuous circulation, while at the same time providing means by which a portion of the circulating feed may be diverted through a nozzle into the craw or stomach of the individual bird being fed.

A further object is to provide a structure in which the liquid feed is circulated and kept in agitation so that each bird receives a uniform moisture content of feed and no clogging of pipes or valves takes place.

Yet another object is to provide a poultry feeding apparatus in which the nozzle pressure may be regulated and controlled to supply a feed pressure which is proper for the type of poultry being fed.

A still further object is to provide a poultry feeding machine which is simple and relatively inexpensive in construction, efficient and economical in operation, and easy to clean and maintain.

Other specific objects and advantages will appear as the specification proceeds.

The invention is illustrated, in preferred embodiments, by the accompanying drawings, in which:

Fig. 1 is a plan view of the poultry feeding machine.

Fig. 3 is a vertical section of part of the machine, taken on line 3—3 of Fig. 2.

Fig. 4 is an enlarged vertical longitudinal section of the nozzle and side-outlet T joint, taken on line 4—4 of Fig. 1.

Fig. 5 is a vertical section of a portion of the machine showing a modification of the invention in which a nozzle having no valve is attached at an outlet opening of the T joint.

Fig. 6 is a perspective view of the bottom of the tank.

Fig. 7 is an enlarged side elevational view showing the brackets on which the motor is mounted.

Fig. 8 is an end view in elevation, also showing the motor mountings.

Figure 2:
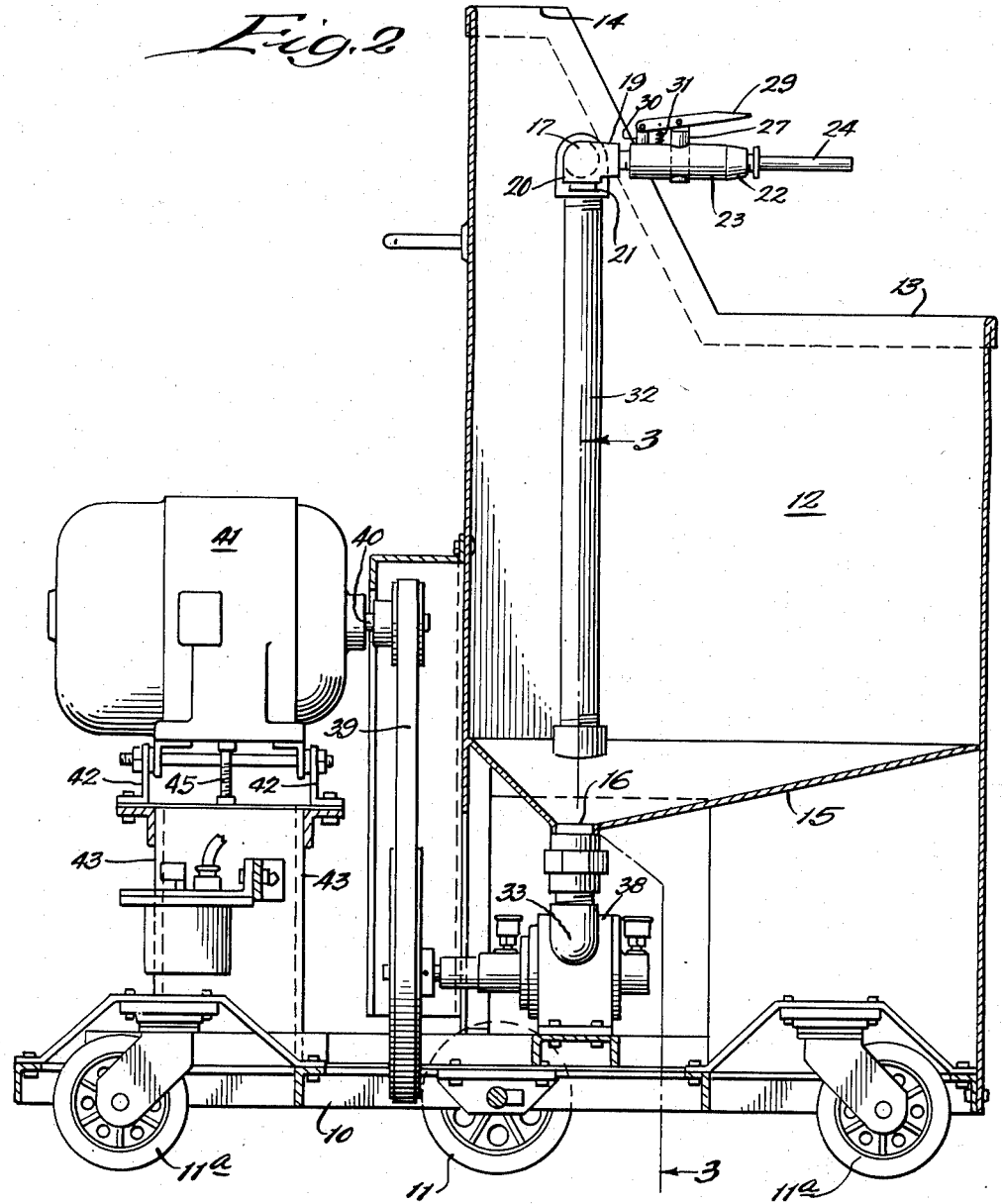
Fig. 2 is a vertical section of the entire machine, taken on line 2—2 of Fig. 1.

In the illustration given, the numeral 10 designates a base or frame. In the illustration given, base 10 is an angle iron frame having substantially the shape of an oval. This base is mounted on two wheels 11, one at each side, and on two wheels 11a, one at each end, the latter wheels 11a being pivotally attached in order to render the base freely maneuverable.

Mounted on base 10 is a tank 12 which is adapted to hold liquid feed material. Preferably, tank 12 has an open top, the front part 13 being cut away and lower than the back part 14, so that the machine can be rolled partly under a feed mixer for filling. In a preferred embodiment of the invention, best shown in Fig. 6, tank 12 has a bottom 15 which slopes downward to form a lowermost point which is out of vertical alignment with what would be the vertical axis of the tank, and the tank is provided with an outlet opening 16 at this lowermost point.

Positioned over tank 12 is a hollow side-opening T joint 17. In the illustration given, the horizontal arms 18 and 19 of the hollow T joint have been bent to form a right angle with each other, thus producing a "side-opening T joint." The opening in horizontal arm 18 acts as an inlet opening and the one in horizontal arm 19 acts as an outlet opening, as does the downward-facing opening in the vertical arm 20 of the tee. The inside of vertical arm 20 is threaded and the size of the downward facing outlet opening can be varied by fitting the inside of arm 20 with various tubular plugs 21 having different inside diameters. The inside walls of horizontal arms 18 and 19 are also threaded. Preferably, joint member 17 is positioned over the liquid level in tank 12 out of vertical alignment with the lowermost point in the bottom of the tank.

In the illustration presented, a nozzle 22 is attached at the opening in horizontal arm 19. As best shown in Fig. 4, the nozzle consists of a hollow body portion 23, one end of which is fitted with threads and adapted to screw into the opening in the horizontal arm 19 of T joint 17. The other end of body portion 23 is also threaded and is adapted to receive the threaded end of a tubular extension 24. Between its two ends, body portion 23 is fitted with any suitable shut-off valve.

The valve illustrated in the attached drawings is a lever operated gate valve. It consists of a channel 25 which is perpendicular to, and communicates with, the lengthwise channel 26 in body portion 23. Slidably positioned in channel 25 is a substantially solid rod 27 through which is cut a channel 28 parallel with channel 26. Rod 27 is pivotally attached to a lever 29, which in turn is pivotally attached to a stationary bar 30 and a spring 31. Downward pressure of lever 29 serves to compress spring 31 and to bring channel 28 into coaxial alignment with channel 26, thus opening the valve. When pressure on the lever 29 is released, spring 31 urges lever 29 away from body portion 23, thus bringing channel 28 out of coaxial alignment with channel 26 and closing the valve.

Any suitable flow-enclosing duct will serve to connect the opening in the bottom of tank 12 with an inlet opening in joint 17. In the illustration given, the numeral 32 represents a pipe which is divided into several sections for easy disassembly and cleaning. This pipe leads from opening 16 at the lowermost point in the bottom of tank 12 and communicates with the inlet opening in horizontal arm 18 of side-opening T joint 17. As shown, pipe 32 extends downward from opening 16 and then, by means of two right angle joints 33 and 34, projects upward through the bottom of tank 12, through the liquid feed material therein, and communicates with the opening in arm 18 of joint 17. Pipe 32 is preferably a rigid member which not only serves to conduct the flow of liquid feed material but also acts as a rigid support for joint 17 and the nozzle 22 attached thereto. If desired, joint 17 may be pivotally attached to pipe 32 so that nozzle 22 can be swung up or down as required.

Suitably, pipe 32 is equipped with a shut-off valve 35, operated by a hand wheel 36, by means of which the flow of feed material into joint 17 can be shut off; and suitably, pipe 32 is equipped with a closeable outlet opening at a point between the tank and valve 35. As illustrated in Fig. 3, an outlet opening equipped with a removable plug 37 is provided in the right angle joint 34.

Any suitable means will serve for withdrawing liquid feed material from the tank and forcing it under pressure through pipe 32 into joint 17. In the illustration given, a pump 38 is mounted on base 10 under tank 12 and is sealed into the horizontal portion of pipe 32 between right angle joints 33 and 34. Pump 38 is driven by a belt 39 communicating with the drive shaft 40 of motor 41.

The motor 41 is mounted on a frame 43, by means of brackets 42 and 42a, frame 43 itself being mounted on base 10. Brackets 42 are provided with a vertical slot 44 and thus not only serve to support the motor but also provide means for raising the motor and thereby tightening belt 39. The apparatus is also provided with an adjusting screw 45, which works in combination with slotted brackets 42 to raise or lower the motor.

In the operation of the machine described above, the machine is first moved into position beneath a feed mixer, and tank 12 is filled with the desired liquid feed material. The machine is then moved into position between the rows of poultry batteries, and the motor is started. Pump 38 is driven by motor 41 and acts to withdraw the liquid feed material from the bottom of tank 12 and to force it under pressure up through pipe 32 into T joint 17. In its normal position, the gate valve in nozzle 22 is kept closed by the action of spring 31 against lever 29. Therefore, none of the liquid feed material which is forced into joint 17 is able to gain outlet through nozzle 22, and all of it must drop back into tank 12 through the downward-facing opening in vertical arm 20 of T joint 17. In this manner, when the nozzle valve is in its normal closed position, a continuous circulation of the liquid feed material is maintained, the liquid feed continuously being pumped from the bottom of the tank up to a point above the tank and dropped back down into the liquid feed still remaining in the tank.

When a continuous circulation such as this has been set up, the actual feeding operation is ready to begin. The operator then inserts nozzle 22 in the beak of the bird to be fed and presses nozzle lever 29 toward body member 23, thus bringing channel 28 into alignment with channel 26. In this manner the nozzle valve is opened, and a portion of the liquid feed circulating through T joint 17 is diverted through nozzle 22 into the craw or crop of the bird being fed. It is important to note that, even when the nozzle valve is open, a continuous circulation is still maintained and a portion of the feed material pumped from the bottom of the tank is still being dropped back into the tank through the opening in vertical arm 20 of the T. The only difference that exists when the nozzle valve is open is the fact that a portion of the circulating feed is being diverted at the T joint and is gaining outlet through the nozzle. The force of the stream of liquid feed material issuing from the nozzle, when the nozzle valve is open, can be varied by varying the size of the opening in arm 20 of T 17. The smaller the opening in arm 20, the greater the force of the stream which issues from the nozzle when the valve is opened. The size of the opening in arm 20 can be varied by removing tubular plug 21 and replacing it with a plug having a larger or smaller inside diameter. In the operation of our machine, the force of the stream of liquid feed material issuing from the nozzle can also be varied by varying the moisture content of the feed.

By the above methods of control, the force of the liquid stream issuing from the nozzle is regulated so that, when the bird's crop becomes full, the back pressure which is built up automatically interrupts the flow of feed into the crop. The entire amount of feed being pumped into T joint 17 then by-passes nozzle 22 and falls back into the tank through the opening in vertical arm 20. At this point, the operator releases nozzle lever 29, thereby closing the nozzle valve and preventing any resumed flow of feed out through the nozzle when it is withdrawn from the bird's beak.

Closing the nozzle valve of course does not interrupt the continuous circulation of feed material within the machine, and the operator is able to pass on to the next bird and repeat the operation merely by opening the nozzle valve and closing it when the flow of feed out through the nozzle has stopped by reason of the bird's crop becoming full. This procedure may be repeated as long as the liquid level in the tank is high enough so that no air is pumped along with the feed material.

It is understood that the hollow joint member 17 is provided with an outlet opening for the nozzle and with one additional outlet opening. At least one such additional opening is necessary in order to make possible the continuous circulation of the liquid feed, both when the nozzle valve is open and when it is closed.

The continuous circulation of feed material works in combination with the eccentrically sloped bottom of the tank to provide a substantially complete agitation of feed within the tank; and the agitation in turn operates to prevent channeling and sedimentation of by-passed feed solids. Thus each bird is supplied with feed having a uniform moisture content. The continuous circulation of feed also prevents clogging of pipes and valves and insures that no air will be pumped into the craw of any bird.

Side-opening T joint 17 works in combination with the continuous circulation of feed material to insure that the liquid feed will issue from the nozzle in a stream which is steady and firm, and yet gentle enough to be interrupted automatically by the back-pressure caused when the bird's crop becomes full. Thus we eliminate the possibility of injury to the birds, which heretofore has been a great disadvantage in the use of motor driven poultry feeding machines.

Fig. 5 shows a modification of the invention in which a valveless nozzle 46 is attached at the outlet opening in arm 19 of T joint 17. When nozzle 46 is being used, it must be swung downward and positioned such that both the stream issuing from the nozzle opening, and the one issuing from the outlet opening in arm 20 of the T, are directed back into tank 12. In the operation of the machine incorporating this modification, the operator starts the motor and pump, so that a continuous circulation of liquid feed material is set up. At this point, two streams are being directed back into the tank—one through nozzle 46 and one through the opening in arm 20. The operator then inserts nozzle 46 in the beak of the bird to be fed, and, when the bird's crop is full, a back pressure is set up which interrupts the flow of feed out through the nozzle, thus causing the full flow of feed to by-pass the nozzle and fall back into tank 12 through the opening in arm 20. In this type of operation, nozzle 46 does not require a shut-off valve because, although there is a resumed flow of feed out through the nozzle when it is withdrawn from the bird's beak, this resumed stream is directed back into the tank, and no loss of feed material results.

While, in the foregoing specification, we have set forth a structure in great detail for the purpose of illustrating one embodiment of our invention, it will be understood that such details may be varied widely by those skilled in the art without departing from the spirit of our invention.

We claim:

1. A poultry feeding machine comprising a traveling frame mounted on wheels; a motor and a tank carried on the frame, said tank being adapted to hold liquid feed material and having a bottom which slopes downward to form a lowermost point eccentrically disposed with respect to the geometric center of the bottom of said tank; a hollow side-opening T joint having an inlet opening and at least two outlet openings and positioned over the liquid level in said tank at a distance from a vertical line intersecting said lowermost point in the bottom of the tank; a nozzle member attached at an outlet opening of said T joint and being provided with a lever-operated gate valve; a connecting pipe leading from an opening in said lowermost point in the bottom of the tank and communicating with the inlet opening in said T joint; and a pump driven by said motor and adapted to withdraw liquid feed from the bottom of said tank and force it under pressure through said pipe into said T joint.

2. A poultry feeding machine comprising a traveling frame mounted on wheels; a motor and a substantially vertical tank carried on the frame, said tank being adapted to hold liquid feed material and having a bottom which slopes downward to form a lowermost point eccentrically disposed with respect to the geometric center of the bottom of said tank; a hollow side-opening T joint having an inlet opening and at least two outlet openings and positioned over the liquid level in said tank at a distance from a vertical line intersecting said lowermost point in the bottom of the tank; a nozzle member attached at an outlet opening of said T joint and being provided with a lever-operated gate valve; a connecting pipe leading from an opening in said lowermost point in the bottom of the tank and communicating with the inlet opening in said T joint; a pump driven by said motor and adapted to withdraw liquid feed from the bottom of said tank and force it under pressure through said pipe into said T joint; a shut-off valve in said pipe; and a closeable opening in said pipe between the tank and the said shut-off valve.

3. A poultry feeding machine comprising a base; a tank having substantially vertical walls mounted on said base and adapted to hold liquid feed material, said tank having a bottom surface sloping downward to form a lowermost point eccentrically disposed with respect to the geometric center of the bottom of said tank; an opening in the tank at said lowermost point; a hollow joint member having an inlet opening and first and second outlet openings, said member being positioned over the liquid level in said tank at a distance from a vertical line intersecting said opening; a tubular connecting duct leading from said tank opening and communicating with the inlet opening in said joint member; means for withdrawing liquid feed from said tank through said tank opening and forcing it in a stream under pressure through said connecting duct into said joint member, the latter member being adapted to direct a minor portion of said stream through the first outlet opening for feeding purposes and to direct a major portion of the stream through the second outlet opening for mixing purposes, said second opening being disposed downward so as to cause the major portion of the stream to fall downward within the tank to a point located at a distance from a vertical line intersecting said tank opening.

HENRY J. REYNOLDS.
VERNON R. STRONG.

REFERENCES CITED

The following references are of record in the file of this patent:

UNITED STATES PATENTS

| Number | Name | Date |
|---|---|---|
| 406,248 | Williams | July 2, 1889 |
| 1,700,471 | Davis | Jan. 29, 1929 |
| 2,089,215 | Lomax | Aug. 10, 1937 |
| Re. 21,755 | Kelley | Mar. 21, 1941 |
| 2,308,181 | Laird | Jan. 12, 1943 |
| 2,474,136 | Wilson et al. | June 21, 1949 |

FOREIGN PATENTS

| Number | Country | Date |
|---|---|---|
| 4,645 | Great Britain | Mar. 25, 1890 |